UNITED STATES PATENT OFFICE.

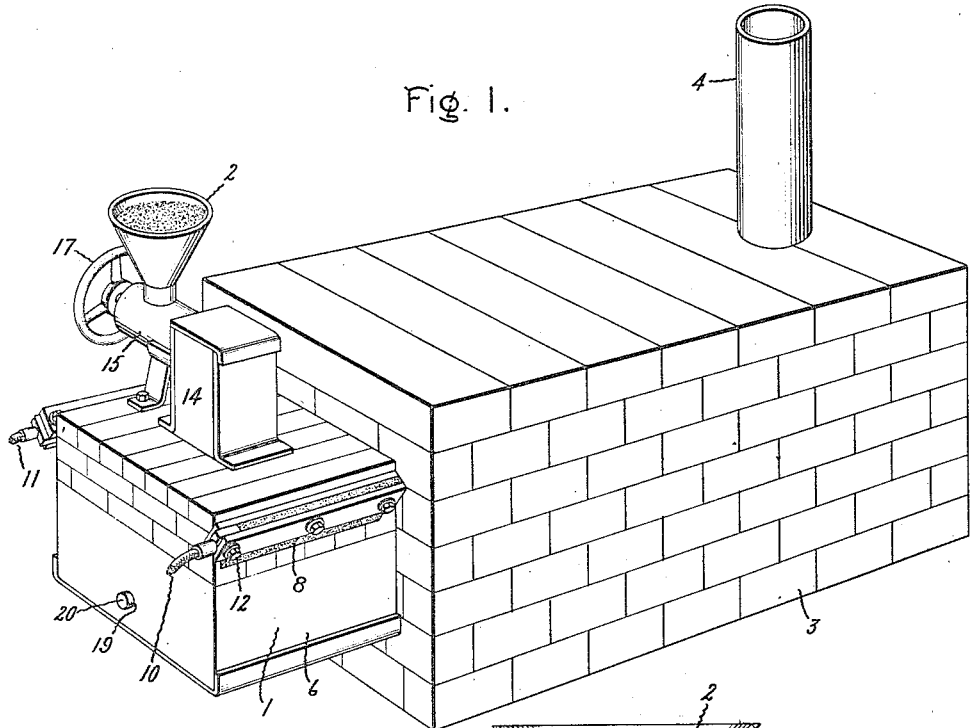

CHRISTIAN DANTSIZEN, OF SCHENECTADY, NEW YORK, ASSIGNOR TO GENERAL ELECTRIC COMPANY, A CORPORATION OF NEW YORK.

PROCESS AND APPARATUS FOR PREPARING MAGNESIUM CHLORID.

1,276,499.

Specification of Letters Patent. Patented Aug. 20, 1918.

Application filed April 22, 1916. Serial No. 92,841.

*To all whom it may concern:*

Be it known that I, CHRISTIAN DANTSIZEN, a citizen of the United States, residing at Schenectady, county of Schenectady, State of New York, have invented certain new and useful Improvements in Processes and Apparatus for Preparing Magnesium Chlorid, of which the following is a specification.

The present invention relates to the preparation of anhydrous magnesium chlorid from anhydrous ammonium magnesium chlorid.

Ammonium magnesium chlorid may be prepared by mixing in water as a dissolving menstrum molecular proportions of ammonium chlorid and magnesium chlorid and evaporating to dryness. The resulting double chlorid is hydrated. The combined water may be driven off by heating the hydrous chlorid to a temperature high enough to drive off water, but materially below the dissociation temperature of the salt. Preferably, the heating is so regulated that the double chlorid does not assume a temperature in excess of about 215 to 230° C. The preparation of the anhydrous ammonium magnesium chlorid is not a part of my invention, but is described and claimed in an application filed by Curtis C. Wallace, Serial No. 92821, filed concurrently herewith.

In accordance with my invention, the anhydrous chlorid is dissociated by charging the same into a fused bath maintained at a temperature in excess of 300° C., preferably as high as 500 to 600° C., this fusion preferably consisting of magnesium chlorid when the preparation of the pure magnesium chlorid is desired. The vaporized ammonium chlorid is collected by condensation and used over again.

In the accompanying drawings, Figure 1 is a perspective view of the apparatus as a whole, and Fig. 2 is a vertical section through the chamber in which the dissociation of ammonium magnesium chlorid occurs.

The apparatus as shown in Fig. 1 consists of a dissociation chamber 1, into which the anhydrous ammonium magnesium chlorid is discharged through a hopper 2. In communication with this chamber 1 is a condensing chamber 3 provided with a vent pipe 4. The condensing chamber may be very much larger in proportion to the dissociation chamber than indicated in the drawing. As shown in the sectional view, Fig. 2, the dissociation chamber comprises a container constituted by a fire-brick wall 5 reinforced by an outer metal casing 6, and in this chamber is maintained a fusion 7 which preferably consists of magnesium chlorid. If at the beginning of the operation no anhydrous magnesium chlorid is available, and the magnesium chlorid to be prepared is to be used for the electrolysis of magnesium, the dissociation apparatus may be charged with a fusion of sodium or potassium chlorid, as the presence of the latter chlorid is unobjectionable and even desirable in the electrolytic cell. The fusion may be heated in any convenient way, but preferably the heat is internally generated by the conduction through the salt of an alternating current of suitable energy. This current is introduced by electrodes 8, 9, preferably consisting of carbon. The current supply wires 10, 11, connected to the terminal clamps 12, 13, have been indicated as carrying an alternating current, as it is not desired that electrolysis of metal should occur in the dissociation chamber.

The salt to be dissociated is introduced through a stack 14 communicating with a hopper 2 through a conduit 15, in which is located a screw feed 16 operable through hand-wheel 17. The fusion should be maintained at a temperature materially in excess of 300° C., at which temperature the double chlorid begins to dissociate. As magnesium chlorid fuses at a temperature of about 500 to 600° C., no particular attention needs to be paid to the temperature when the fusion consists of this salt as long as the magnesium chlorid is continuously maintained in a fused state. The volatilized ammonium chlorid escapes into condensing chamber 3 through a communicating door 18, and the accumulations of ammonium chlorid are removed from time to time from the condenser and used for the preparation of fresh quantities of ammonium magnesium chlorid. The ammonium chlorid may be immediately dissolved, as fast as it is volatilized, by a spray of water in the condensing chamber. The quantities of magnesium chlorid are removed from the fusion from time to time through a tap hole 19, by removing a plug 20.

What I claim as new, and desire to secure by Letters Patent of the United States, is:

1. The process of preparing anhydrous magnesium chlorid which consists in maintaining in a fused state a quantity of magnesium chlorid in an inclosed space, and charging anhydrous ammonium magnesium chlorid into said fusion.

2. The process of preparing anhydrous magnesium chlorid which consists in maintaining in a fused state a quantity of magnesium chlorid in an inclosed space, charging anhydrous ammonium magnesium chlorid into said fusion, conducting away volatilized ammonium chlorid and condensing the same.

3. The process of preparing anhydrous magnesium chlorid, which consists in charging anhydrous ammonium magnesium chlorid into a fused bath maintained at a temperature above 300° C., thereby dissociating said ammonium magnesium chlorid into magnesium chlorid and ammonium chlorid, conducting away the vaporized ammonium chlorid, and collecting the magnesium chlorid for use.

4. The process of preparing anhydrous magnesium chlorid, which consists in charging anhydrous ammonium magnesium chlorid into an inclosed space, heating said chlorid within said space to a temperature high enough to dissociate said ammonium magnesium chlorid into magnesium chlorid and ammonium chlorid, the ammonium chlorid being vaporized, recovering the ammonium chlorid by condensation in a closed space, removing portions of said magnesium chlorid for use and replenishing said bath by adding ammonium magnesium chlorid while maintaining the space above said bath closed.

In witness whereof, I have hereunto set my hand this 21st day of April, 1916.

CHRISTIAN DANTSIZEN.